US008210218B2

(12) United States Patent
Nakamura et al.

(10) Patent No.: US 8,210,218 B2
(45) Date of Patent: Jul. 3, 2012

(54) PNEUMATIC TIRE WITH TREAD HAVING ISOSCELES TRAPEZOIDAL BLOCK PORTION BETWEEN LUG GROOVES

(75) Inventors: Yoichi Nakamura, Kodaira (JP); Takashi Kodama, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 1245 days.

(21) Appl. No.: 11/659,206

(22) PCT Filed: Jul. 27, 2005

(86) PCT No.: PCT/JP2005/013708
§ 371 (c)(1),
(2), (4) Date: Dec. 3, 2007

(87) PCT Pub. No.: WO2006/013758
PCT Pub. Date: Feb. 9, 2006

(65) Prior Publication Data
US 2008/0289738 A1 Nov. 27, 2008

(30) Foreign Application Priority Data
Aug. 3, 2004 (JP) ................................ 2004-226430
Aug. 10, 2004 (JP) ................................ 2004-233517

(51) Int. Cl.
*B60C 11/03* (2006.01)
(52) U.S. Cl. ......... 152/209.18; 152/209.12; 152/209.13; 152/209.27; 152/902
(58) Field of Classification Search ............ 152/209.12, 152/209.18, 209.27, 902, 209.13
See application file for complete search history.

(56) References Cited

U.S. PATENT DOCUMENTS

| 3,196,920 | A | 7/1965 | Fishman |
| 6,386,652 | B1 | 5/2002 | Bonko |
| 6,761,196 | B2 * | 7/2004 | Takubo .................... 152/209.12 |
| D499,695 | S * | 12/2004 | Tanabe et al. ................ D12/603 |
| 2004/0211502 | A1* | 10/2004 | Ono ......................... 152/209.19 |
| 2007/0199633 | A1* | 8/2007 | Hayashi ................... 152/209.18 |

FOREIGN PATENT DOCUMENTS

EP    1 403 098 A1    3/2004
(Continued)

OTHER PUBLICATIONS

Machine translation for Japan 2004-262295 (no date).*
(Continued)

*Primary Examiner* — Steven D Maki
(74) *Attorney, Agent, or Firm* — Sughrue Mion, PLLC

(57) ABSTRACT

A pneumatic tire which prevents one-sided biased abrasion from being generated, the pneumatic tire having a non-directed rotational direction and comprises lug grooves 20 cutting across a land portion at a shoulder side of a tread portion 16 at both sides in a tire width direction. Each of the lug grooves 20 has a tapered groove portion 21 such that the groove width gradually becomes narrower such that a trapezoidal block portion 22 having a short side at the shoulder side as seen from a tire tread surface side is formed between the lug grooves 20 in a tire peripheral direction. The tapered groove portion 21 is formed so as to extend beyond a one quarter point Q from a tread end T. Accordingly, since in whichever direction the pneumatic tire 10 is rotated, a lug angle α of a trailing end near the one quarter point Q becomes 90 degrees or less, it is possible to prevent one-sided biased abrasion from being generated.

2 Claims, 16 Drawing Sheets

FOREIGN PATENT DOCUMENTS

| | | | |
|---|---|---|---|
| JP | 3-86603 A | | 4/1991 |
| JP | 05-229312 | * | 9/1993 |
| JP | 07-081323 | * | 3/1995 |
| JP | 11-348509 A | | 12/1999 |
| JP | 2000-233610 A | | 8/2000 |
| JP | 2001-55017 A | | 2/2001 |
| JP | 2001-225608 A | | 8/2001 |
| JP | 2001-277816 A | | 10/2001 |
| JP | 2001-315507 | * | 11/2001 |
| JP | 2002-67625 A | | 3/2002 |
| JP | 2003-205706 A | * | 7/2003 |
| JP | 1403098 | * | 3/2004 |
| JP | 2004-155335 A | | 6/2004 |
| JP | 2004-262295 | * | 9/2004 |
| JP | 2004-262295 A | | 9/2004 |

OTHER PUBLICATIONS

Machine translation for Japan 2001-315507 (no date).*
Machine translation for Japan 07-081323 (no date).*
Machine translation for Japan 05-229312 (no date).*
Machine translation for Japan 2003-205706 (no date).*
Supplemental European Search Report dated May 20, 2009 (6 pages).

* cited by examiner

F I G. 2
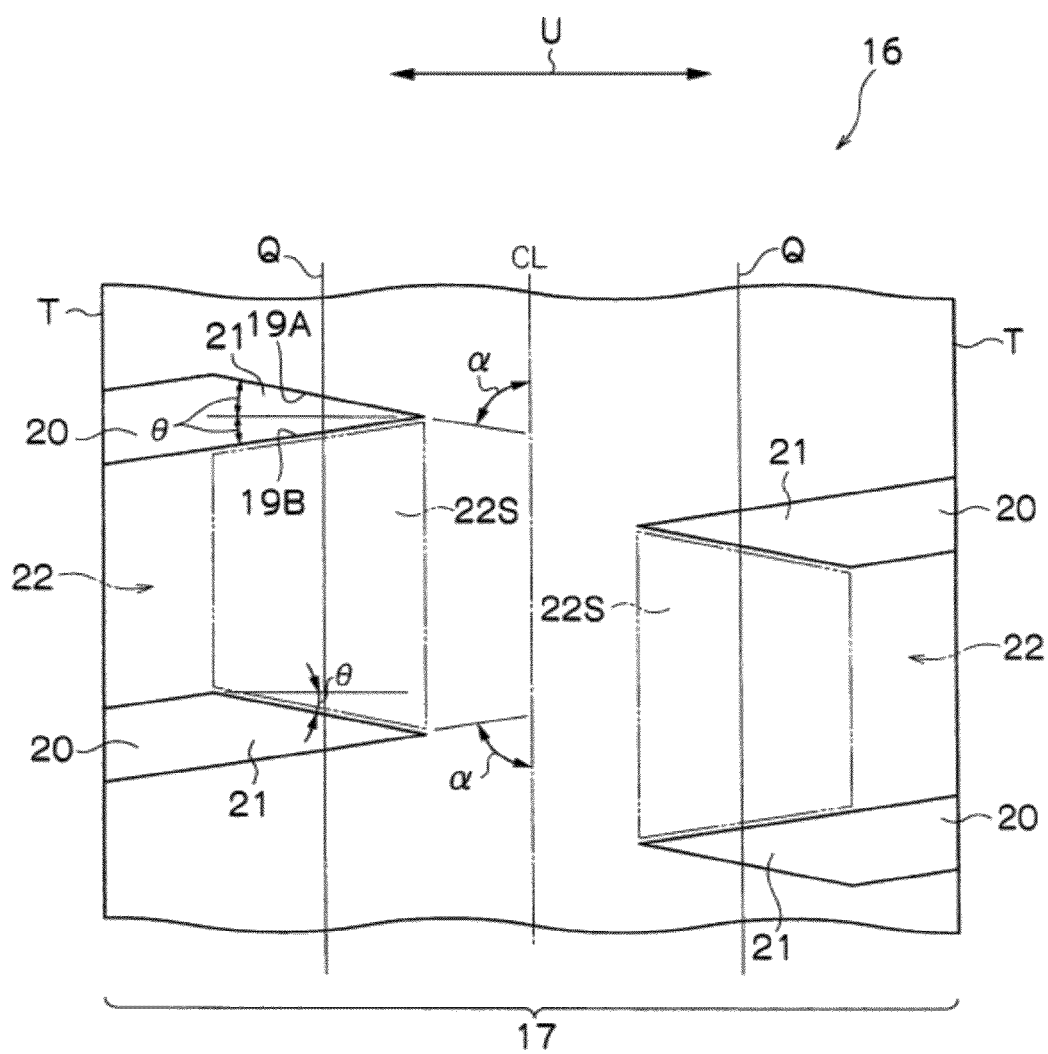

F I G. 1 3   PRIOR ART

PNEUMATIC TIRE WITH TREAD HAVING ISOSCELES TRAPEZOIDAL BLOCK PORTION BETWEEN LUG GROOVES

TECHNICAL FIELD

The present invention relates to an off-road pneumatic tire in which a rotating direction is not specified.

BACKGROUND ART

In a construction vehicle, there has been widely used a heavy load tire for a construction vehicle in which a rotating direction is not specified (a non-directional property is provided) (for example, refer to patent document 1).

A non-directional lug pattern is formed on a tread surface of the heavy load tire for the construction vehicle mentioned above. For example, as shown in FIG. 6, lug grooves 80 are formed on a tread surface portion 87 of a tread portion 86 of the heavy load tire for the construction vehicle according to a related art 1, at a predetermined interval in the same direction as a tire width direction.

In recent years, in the heavy load tire for the construction vehicle mentioned above, it becomes a mainstream to attach a predetermined angle to a lug groove of the lug pattern, for securing an edge component in a width direction, securing a heat radiation performance, and solving a vibration problem. For example, as shown in FIG. 7, in a pneumatic tire according to a related art 2, lug grooves 90 of a tread surface portion 97 are formed so as to be in parallel to each other at an angle θ with respect to a tire width direction.

However, in the case that the lug groove 90 inclined with respect to a tire width direction U, such as the heavy load tire for the construction vehicle according to the related art 2, there is a problem that the lug groove 90 wears at an early stage only in a land portion 93 at one side of the lug groove 90 near a quarter point Q at which a distance from a tread end T is one half of a length from the tread end T to a tire equatorial plane, and a one-side biased abrasion is generated (refer to FIGS. 8 and 9).

In this case, since an input of a side force is large in the case that the heavy load tire for the construction vehicle is installed to a front side, this matter particularly remarkably appears.

Further, as a technique of suppressing the biased abrasion of the tread so as to improve a tire life (an abrasion resistance), there is a technique, for example, disclosed in patent document 2. This is structured such as to increase a rigidity at a shoulder side and suppress a biased abrasion at a shoulder side by arranging a lot of volume of a tread rubber close to the shoulder rather than the tread pattern of the conventional tire. However, according to this related art, a certain degree of improvement of the abrasion resistance appears, however, there is a demand of further improving the abrasion resistance near an intermediate portion between the tire equatorial plane and a ground contact end of the tread, so-called one quarter point, in a market.

Patent Document 1: Japanese Patent Application Laid-Open (JP-A) No. 2000-233610
Patent Document 2: Japanese Patent Application Laid-Open (JP-A) No. 2001-225608

DISCLOSURE OF THE INVENTION

Problem to be Solved by the Invention

The present invention is made by taking the fact mentioned above into consideration, and an object of the invention is to provide a pneumatic tire which prevents a one-side biased abrasion from being generated in comparison with the conventional structure.

Means for Solving the Problem

The inventors of the invention have made a study of a reason why the one-side biased abrasion is generated. Then, the inventors have executed an analyzing calculation, and have found the following matter.

In the heavy load tire for the construction vehicle, since a lot of belt layers are laminated, a curved deformation is generated in a tire width direction within the tread surface at a time of being loaded. As a result, the land portion near the one quarter point is deformed so as to slide to an outer side in the tire width direction at a time of trailing. Accordingly, in the pneumatic tire according to the related art 2, as shown in FIG. 8, the land portion near the one quarter point Q is deformed so as to slide to an outer side UE in the tire width direction at a time of trailing from the tread surface.

On the other hand, a lug groove 90 is sloped at the same angle in the same direction with respect to a tire width direction U. Accordingly, a lug angle (an angle formed by the lug groove with respect to the tire rotational direction) a of a trailing end 94 near the one quarter point Q is different from each other in both sides of a tire equatorial plane CL, in correspondence to a rotational direction of the tire. If the rotational direction is set to a positive axis, a relation α>90 degrees is established at a right side of a paper surface from the tire equatorial plane CL in FIG. 8, and a relation α>90 degrees is established at a left side of the paper surface from the tire equatorial plane CL.

In this case, the trailing end 94 is exposed to a force of sliding in a direction K orthogonal to the trailing end 94, at a time of trailing.

Accordingly, in the case that the relation α>90 degrees is established, the trailing end 94 is exposed to a force of further sliding to the outer side UE in the tire width direction. Therefore, an abrasion of the trailing end 94 is further promoted.

On the other hand, in the case that the relation α<90 degrees is established, the trailing end 94 is exposed to a force of deforming to an inner side in the tire width direction. Therefore, the abrasion of the trailing end 94 is suppressed.

On the basis of the principle mentioned above, the lug groove wears at an early stage only in the land portion 93 at one side of the lug groove.

As shown in FIG. 9, even in the case that the rotational direction of the tire is set reverse, the lug groove 90 wears at an early stage only in the land portion at one side of the lug groove 90 on the basis of the same principle.

Accordingly, the inventors of the invention have made a study of the structure for making the lug angle α at the trailing side near the one quarter point 90 degrees or less whichever directions the tire is rotated, have made repeated experiments, and have completed the invention.

Further, viewing the deformation of a whole of the tire by a cross sectional view, the tread surface which is flat just under the load (illustrated by a two-dot chain line) is deformed such that the portion near the tire equatorial plane CL is concaved, at a time of leading or trailing (before and after being grounded on a road surface or before and after being away from the road surface, illustrated by a solid line), as shown in FIG. 14. As a result, there has been known that a motion of the tread surface to the outer side in the width direction becomes enlarged by a force (an arrow F1) of pulling to an outer side in a direction of a curved deformation of a belt, at a time when the tire is rolled and trailed, near the one quarter point of the tread, and the abrasion resistance is deteriorated. In other words, a shear force (a direction of an arrow F3) in the tire width direction is applied to the tread at a time of being trailed (particularly between a one quarter point and three eighths), and the outer portion from a one quarter point of the tread 12 is shear deformed in the width direction so as to generate a slip with respect to the road surface, as shown by a cross sectional view in FIG. 15.

In this connection, a compression force (an arrow F2) is applied toward the tire equatorial plane CL near the center of the tread.

FIG. 16 is a graph showing a tread surface shape position of a tire (tire size: 4000R57) at a time of trailing, in which a vertical axis indicates a radial position of the tread surface, and a horizontal axis indicates a position in a width direction of the tread surface (0 in the horizontal direction indicates a tire equatorial plane position).

According to a first aspect of the invention, there is provided a pneumatic tire having a non-specified rotational direction and comprising lug grooves cutting across at least a land portion at a shoulder side of a tread portion at both sides in a tire width direction, wherein the number of the lug grooves is in a range of from 32 to 44 at each side in the tire width direction, a negative rate of a tread surface portion of the tread portion is a range of from 15 to 30%, each of the lug grooves has a tapered groove portion wherein a groove width gradually becomes narrower such that a trapezoidal block portion having a short side at the shoulder side as seen from a tire tread surface side is formed between the lug grooves in a tire peripheral direction, and the tapered groove portion is formed such that a distance from a tread end extends beyond a one quarter point corresponding to one half of a length from the tread end to the tire equatorial plane.

The tread end indicates an outermost ground portion in the tire width direction in the case that a pneumatic tire is installed to a standard rim defined in JATMA YEAR BOOK (Japan Automobile Tire Manufacturers Association Standard edited on 2002), 100% of an air pressure (a maximum air pressure) corresponding to a maximum load capacity (bald face load in internal pressure-load capacity correspondence table) in an applied size and ply rating in JATMA YEAR BOOK is filled as an internal pressure, and the maximum load capacity is loaded. In the case that TRA standard and ETRTO standard is applied in a used place or a manufactured place, the pneumatic tire depends on each of the standards. The tread surface portion corresponds to a portion pinched by tread ends at each side in the tire width direction in the tread portion.

According to the invention of the first aspect, since the lug groove has the tapered groove portion as mentioned above, the trapezoidal block portion having the short side at the shoulder side as seen from the tire tread surface side is formed. Accordingly, whichever direction the tire is rotated, the lug angle α of the trailing end near the one quarter point becomes 90 degrees or less, and therefore, it is possible to obtain the pneumatic tire which prevents the one-side biased abrasion from being generated.

If the number of the lug grooves mentioned above is less than 32 in at least one side in the tire width direction, a heat radiation effect is reduced, and a heat system failure tends to be generated, and accordingly, this structure is not preferable. Further, if the number of the lug grooves mentioned above is more than 44 in at least one side in the tire width direction, a lug rigidity becomes small, and an early abrasion is generated, and accordingly, this structure is not preferable.

Further, if a negative rate of the tread surface portion of the tread portion is less than 15%, the heat radiation effect is reduced, and the heat system failure tends to be generated and accordingly, this structure is not preferable, and if it is more than 30%, the lug rigidity becomes small and the early abrasion is generated, and accordingly, this structure is not preferable.

Further, if the tapered groove portion mentioned above is not formed so as to extend beyond the one quarter point mentioned above, all of the trapezoidal block portions are positioned at the outer side in the tire width direction, or all of the trapezoidal block portions are positioned closer to the tire equatorial plane side than the one quarter point mentioned above. In this case, the portion which is exposed to the curved deformation of the belt, generates the slip in the width direction and generates the abrasion (the biased abrasion) is a portion near the one quarter point, and accordingly, if the trapezoidal block portion does not rest on the one quarter point, the effect can not be obtained so much. Therefore, according to the invention described in the first aspect, the tapered groove portion is formed such that the distance from the tread end extends beyond the one quarter point corresponding to the one half of the length from the tread end to the tire equatorial plane.

According to a second aspect of the invention, there is provided a pneumatic tire according to the first aspect, wherein the tread portion comprises a pair of peripheral narrow grooves, disposed one on either side of the tire equatorial plane, and a plurality of widthwise narrow grooves disposed at a tire equatorial plane side and spaced in the tire peripheral direction, a belt is disposed at an inner side in a tire diameter direction of the tread portion, the widthwise narrow grooves have a groove width that is choked when grounded, and the peripheral narrow grooves are disposed at an outer side in the tire width direction with respect to the one quarter point and at an inner side in the tire width direction with respect to an outermost end in the tire width direction of the belt, a groove depth is equal to or less than a groove depth of the lug groove, and a groove width is set in a range of from 1 to 2.5% of the tread width.

According to the pneumatic tire of the second aspect, since the peripheral narrow grooves set to the groove width choked when grounded is disposed at the outer side in the tire width direction with respect to the one quarter point which is one quarter of the tread width away from the tire equatorial plane to the outer side in the tire width direction, and at the inner side in the tire width direction with respect to the outermost end in the tire width direction of the belt, the peripheral narrow grooves obstructs the transmission of the influence of the shear deformation of the outer portion of the tread to the portion near the one quarter point. Accordingly, it is possible to suppress the motion of the tread surface to the outer side at the trailing time caused by the belt curved deformation near the one quarter point, and as a result, it is possible to improve the abrasion resistance near the one quarter point.

In this case, if the groove width of the widthwise narrow groove becomes less than 1%, a durability of a mold frame (or a blade (a metal plate)) for forming the widthwise narrow groove is undesirably lowered.

On the other hand, if the groove width of the widthwise narrow groove gets over 2.5% of the tread width, the motion of the tread becomes large, and causes the abrasion.

In this case, "when grounded" of the groove width that is choked when grounded means at when the tread is grounded on the road surface.

According to a third aspect of the invention, there is provided a pneumatic tire according to the first aspect or the second aspect, wherein an auxiliary groove extending in the tire peripheral direction is provided in a tread center portion.

Accordingly, it is possible to easily form the trapezoidal block portion striding beyond the one quarter point. Therefore, it is easy to suppress the abrasion at the trailing side of the one quarter point. Further, it is possible to radiate the heat generated from the block of the tread center portion via the auxiliary groove, by forming the auxiliary groove in the tread center portion.

According to a fourth aspect of the invention, there is provided a pneumatic tire according to the second aspect, wherein an auxiliary groove extending in the tire peripheral direction is provided at a tread center portion, and a negative rate at an inner side of the pair of peripheral narrow grooves and within a range of a length corresponding to 1 pitch in the tire peripheral direction of the main lug groove is set in a range of from 15 to 30%.

It is possible to radiate the heat generated from the block of the tread center portion via the auxiliary groove, by forming the auxiliary groove in the tread center portion.

In this case, if the negative rate at the inner side of the pair of peripheral narrow groves of the tread and within the range of the length corresponding to 1 pitch in the tire peripheral direction of the main lug groove becomes less than 15%, it is impossible to sufficiently radiate the heat of the tread under the use in the market. On the other hand, if the negative rate gets over 30%, a stone biting performance in the tread center portion is deteriorated, and the grooves tend to bite the stone at a time of traveling on a punishing road.

According to a fifth aspect of the invention, there is provided a pneumatic tire according to the third aspect or the fourth aspect, wherein a maximum depth of the auxiliary groove is between one eighth and one third of the depth of the main lug groove.

If the maximum depth of the auxiliary groove is less than one eighth of the groove depth of the main lug groove, the heat radiation of the heat generated in the block becomes insufficient.

If the maximum depth of the auxiliary groove gets over one third of the groove depth of the main lug groove, the motion of the tread becomes enlarged, and causes a deterioration of the abrasion resistance.

According to a sixth aspect of the invention, there is provided a pneumatic tire according to any one of the first aspect and the fifth aspect, wherein the tread surface of the trapezoidal block is formed in an isosceles trapezoidal shape.

Accordingly, in the case of attaching the pneumatic tire to the construction vehicle and repeating a forward movement and a backward movement at the same degree, a position near an oblique line of the trapezoidal block portion wears at the same degree. Therefore, a tire service life becomes elongated.

According to a seventh aspect of the invention, there is provided a pneumatic tire according to any one of the first aspect and the sixth aspect, wherein an angle formed by an oblique line of the tread surface of the trapezoidal block portion and the tire width direction is from 10 degrees to 20 degrees.

Since the higher the angle formed by the oblique line of the tread surface of the trapezoidal block portion and the tire width direction is, the higher the effect of suppressing the slip in the width direction is, it is preferable that the angle is 10 degrees or more. However, if the angle is made 20 degrees or more, the groove shape becomes extremely thick, and accordingly, this structure is not preferable. Then, according to the third aspect of the invention, the angle formed by the oblique line of the tread surface of the trapezoidal block portion and the tire width direction is from 10 degrees to 20 degrees.

Accordingly, it is possible to properly increase the effect of suppressing the slip in the width direction.

Effect of the Invention

Since the invention is structured as mentioned above, it is possible to achieve the pneumatic tire which is preferable for the construction vehicle and prevents the one-side biased abrasion from being generated.

BRIEF DESCRIPTION OF THE DRAWINGS

FIG. 2 is a partly plan view showing a lug groove pattern within a tread width in the pneumatic tire relating to the first embodiment;

BEST MODE FOR CARRYING OUT THE INVENTION

A description will be given below of modes for carrying out the invention by giving embodiments.

First Embodiment

Figure 1:
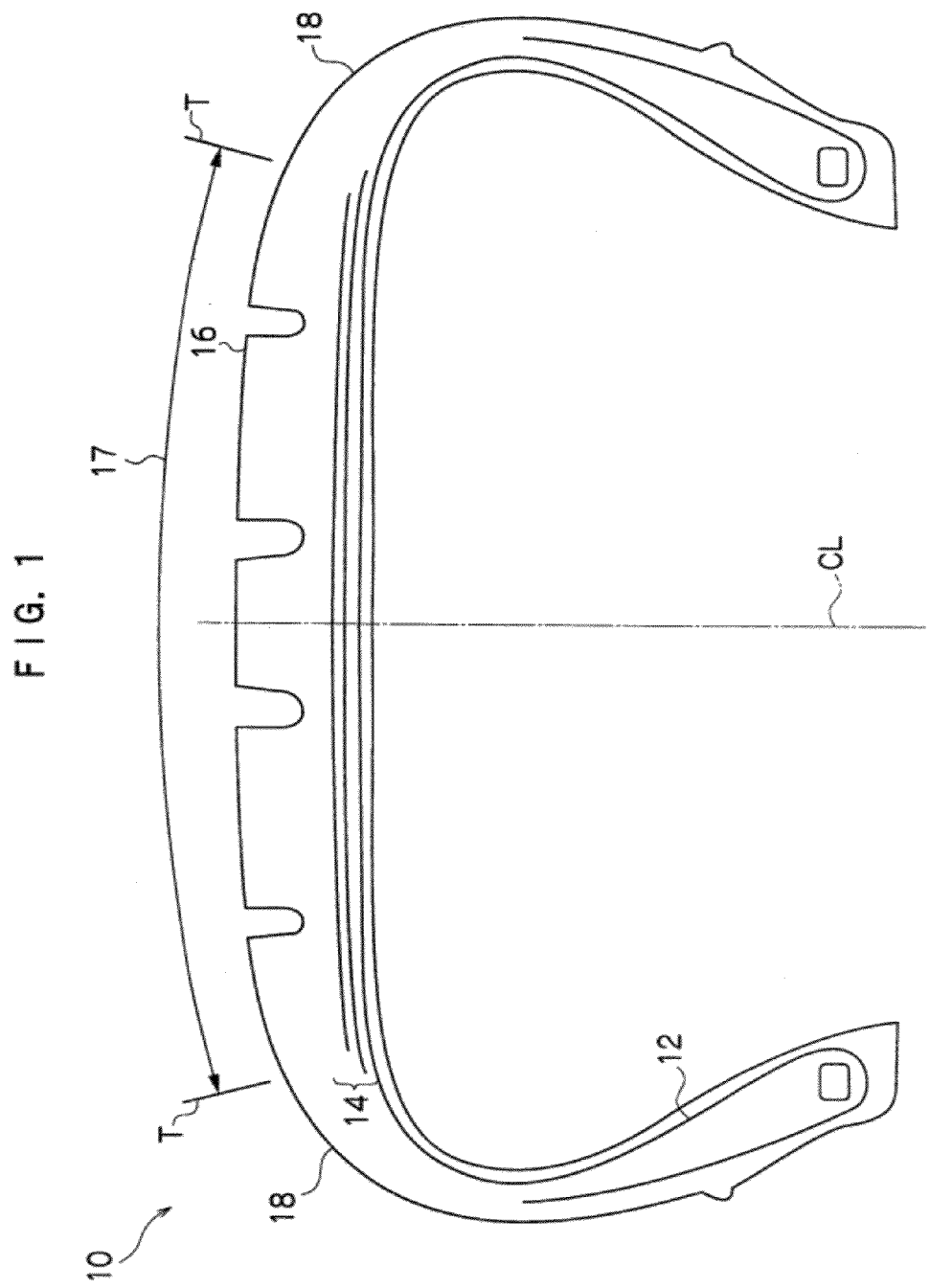
FIG. 1 is a cross sectional view in a tire diametrical direction showing a structure of a pneumatic tire relating to a first embodiment.

A description will be first given of a first embodiment. As shown in FIG. 1, a pneumatic tire 10 for a construction wheel relating to the present embodiment is constituted by a pneumatic tire having a non-specified rotational direction (non-direction), and has a carcass 12 extending in a toroidal shape, a belt 14 provided at an outer side of a crown portion of the carcass 12, and a tread portion 16 provided at an outer side of the belt 14 and connected in the toroidal shape between side wall portions.

The pneumatic tire 10 has lug grooves 20 (refer to FIG. 2) extending to the tread portion 16 from a shoulder portion 18 beyond a tread end T at each side in a tire width direction. At any side in the tire width direction, a number of the lug grooves 20 is set in a range of from 32 to 44. Further, a negative rate of a tread surface portion 17 of the tread portion 16 is within a range of from 15 to 30%.

Further, the lug groove 20 has a tapered groove portion 21 in which a groove width gradually becomes narrower, such that a trapezoidal block portion 22 in which a short side is at a shoulder side as seen from a tire tread surface side is formed between the lug grooves 20 in a tire peripheral direction. The tapered groove portion 21 is formed so as to extend to a tire equatorial plane CL side beyond a one quarter point Q in which a distance from the tread end T is one half of a length from the tread end T to the tire equatorial plane CL.

In the present embodiment, the tapered groove portion 21 is structured such that a direction is reversed and a dimension is identical between one side in the tire width direction (a left side of a paper surface than the tire equatorial plate CL in FIG. 2) and the other side in the tire width direction (a right side of the paper surface than the tire equatorial plane CL in FIG. 2).

The tapered groove portion 21 is shifted at a position in a tire peripheral direction between the one side in the tire width direction and the other side in the tire width direction. As a result, a leading end of the tapered groove portion 21 is not positioned on the same line in the tire width direction between the one side in the tire width direction and the other side in the tire width direction.

Further, in the present embodiment, the position in the tire width direction of the tapered groove portion 21 is set such that the one quarter point Q is positioned at an approximately middle point of an oblique line of the trapezoidal block portion 22.

The tapered groove portion 21 is formed in an isosceles triangular shape as seen from the tire tread surface side, and both of an angle (an acute angle) formed by an oblique line 19A at one side of the tapered groove portion 21 with respect to a tire width direction U, and an angle (an acute angle) formed by an oblique line 19B at the other side of the tapered groove portion 21 with respect to the tire width direction U are set to the same angle θ. As a result, a tread surface 22S of the trapezoidal block portion 22 is formed in an isosceles trapezoidal shape. In the present embodiment, the angle θ is 10 degrees or more and 20 degrees or less.

As described above, according to the present embodiment, since the lug groove 20 has the tapered groove portion 21 mentioned above, there is formed the trapezoidal block portion 22 in which the short side is formed at the shoulder side as seen from the tire tread surface side. Accordingly, whichever direction the pneumatic tire 10 is rotated in, all of lug angles (angles formed by the trailing end with respect to the tire rotational direction) α of the trailing end near the one quarter point Q are identical and become less than 90 degrees. Accordingly, it is possible to achieve the pneumatic tire 10 for the construction vehicle which prevents the one-side biased abrasion from being generated.

Second Embodiment

Figure 3:
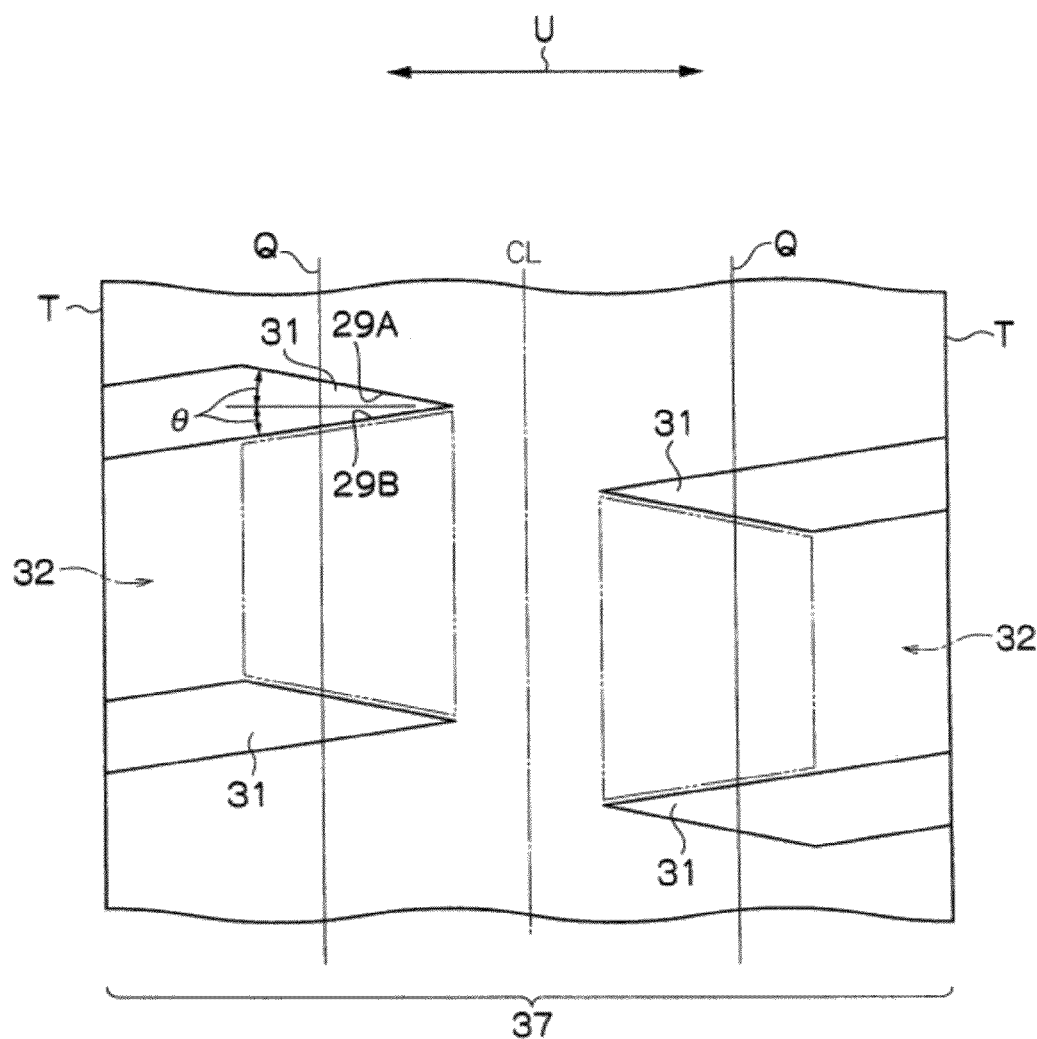
FIG. 3 is a partly plan view showing a lug groove pattern within a tread width in a pneumatic tire relating to a second embodiment.

Next, a description will be given of a second embodiment. As shown in FIG. 3, in a pneumatic tire relating to the present embodiment, a position of the tapered groove portion 31 is different in comparison with the first embodiment.

A tapered groove portion 31 is formed so as to stride over the one quarter point Q, and is formed at a position closer to the tire equatorial plane CL in comparison with the first embodiment. As a result, a trapezoidal block portion 32 formed in a tread surface portion 37 by the tapered groove portion 31 is formed at a position closer to the tire equatorial plane in comparison with the first embodiment. A dimension of the tapered groove portion 31 is the same as that of the tapered groove portion 21, and is formed in an isosceles triangular shape as seen from the tire tread surface side.

According to the present embodiment, it is possible to make a tire temperature at the tire equatorial plane CL side lower than the first embodiment. Further, since the trapezoidal block portion 32 is formed so as to stride over the one quarter point Q, it is possible to suppress the abrasion at the trailing side of the one quarter point Q.

Third Embodiment

Figure 4:
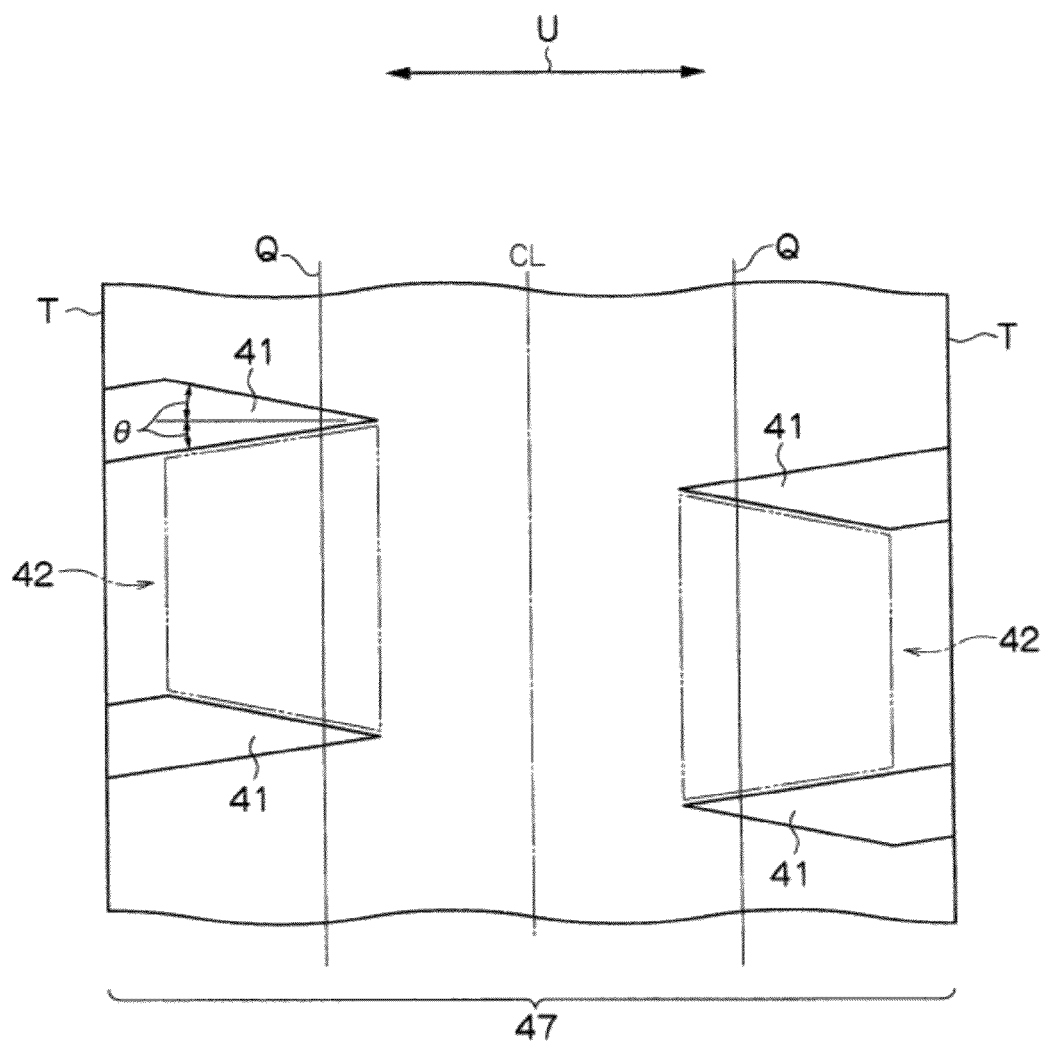
FIG. 4 is a partly plan view showing a lug groove pattern within a tread width in a pneumatic tire relating to a third embodiment.

Next, a description will be given of a third embodiment. As shown in FIG. 4, in a pneumatic tire relating to the present embodiment, a tapered groove portion 41 is formed so as to stride over the one quarter point Q, and is formed at a position far from the tire equatorial plane CL, that is, a position closer to the tread end T, in comparison with the first embodiment. As a result, a trapezoidal block portion 42 formed in a tread surface portion 47 by the tapered groove portion 41 is formed at a position closer to the tread end T in comparison with the first embodiment. A dimension of the tapered groove portion 41 is the same as the tapered groove portion 21, and is formed in an isosceles triangular shape as seen from the tire tread surface side.

According to the present embodiment, it is possible to increase an abrasion resistance at the tire equatorial plane CL side than the first embodiment. Further, since the trapezoidal block portion 32 is formed so as to stride over the one quarter point Q, it is possible to suppress the abrasion at the trailing side of the one quarter point Q.

Fourth Embodiment

Figure 5:
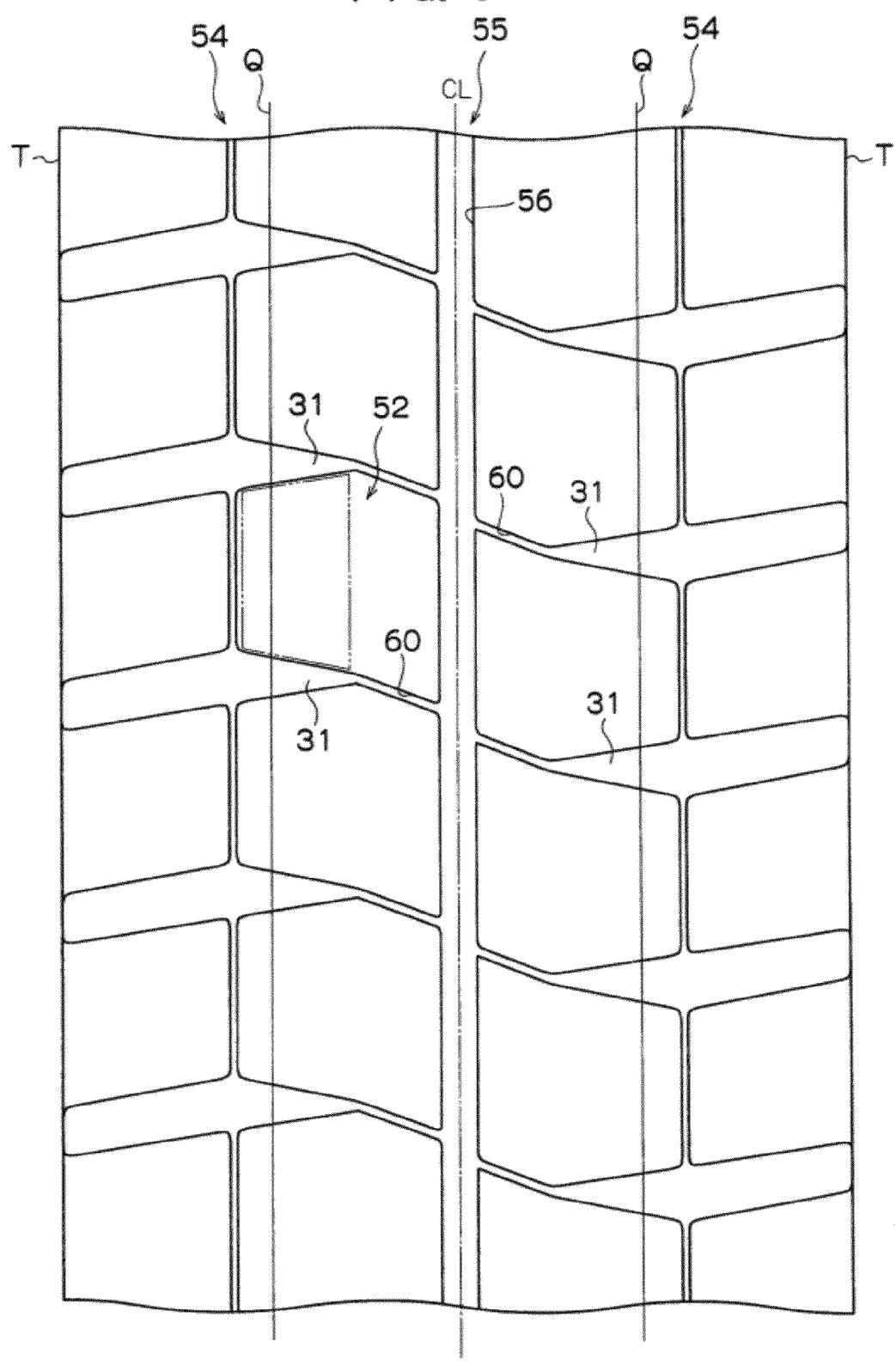
FIG. 5 is a partly plan view showing a lug groove pattern within a tread width in a pneumatic tire relating to a fourth embodiment.

Next, a description will be given of a fourth embodiment. As shown in FIG. 5, in a pneumatic tire relating to the present embodiment, a narrow groove 54 extending in the tire peripheral direction is provided in a tread surface portion 57, at an outer side in the tire width direction than the one quarter point Q in comparison with the second embodiment.

At a time of traveling, in the tread surface portion 57, a force deforming to an outer side in the tire width direction is applied to the land portion at the outer side in the tire width direction than the one quarter point Q, and a force deforming to an inner side in the tire width direction is applied to the land portion at the inner side in the tire width direction than the one quarter point Q.

Accordingly, according to the present embodiment, it is possible to widely reduce the deforming force to the outer side in the tire width direction exposed to the land portion formed so as to stride over the one quarter point Q. Therefore, it is possible to widely reduce an amount of abrasion of the trapezoidal block portion 52 formed so as to stride over the one quarter point Q.

Further, in the present embodiment, a center groove 56 extending in the tire peripheral direction is provided in a tread center portion 55. Further, a connection groove 60 connecting the tapered groove portion 31 at the one side in the tire width direction and the tapered groove portion 31 at the other side in the tire width direction is formed in the tread surface portion 57. As a result, a center narrow groove surrounding type block pattern is formed in the tread surface portion 57, by the center groove 56, the narrow groove 54, the tapered groove portion 31 and the connection groove 60.

According to the present embodiment, it is possible to make the tire temperature at the tire equatorial plane CL side lower than the first embodiment. Further, since the trapezoidal block portion 32 is formed so as to stride over the one quarter point Q, it is possible to suppress the abrasion at the trailing side of the one quarter point Q.

Test Example 1

Figure 6:
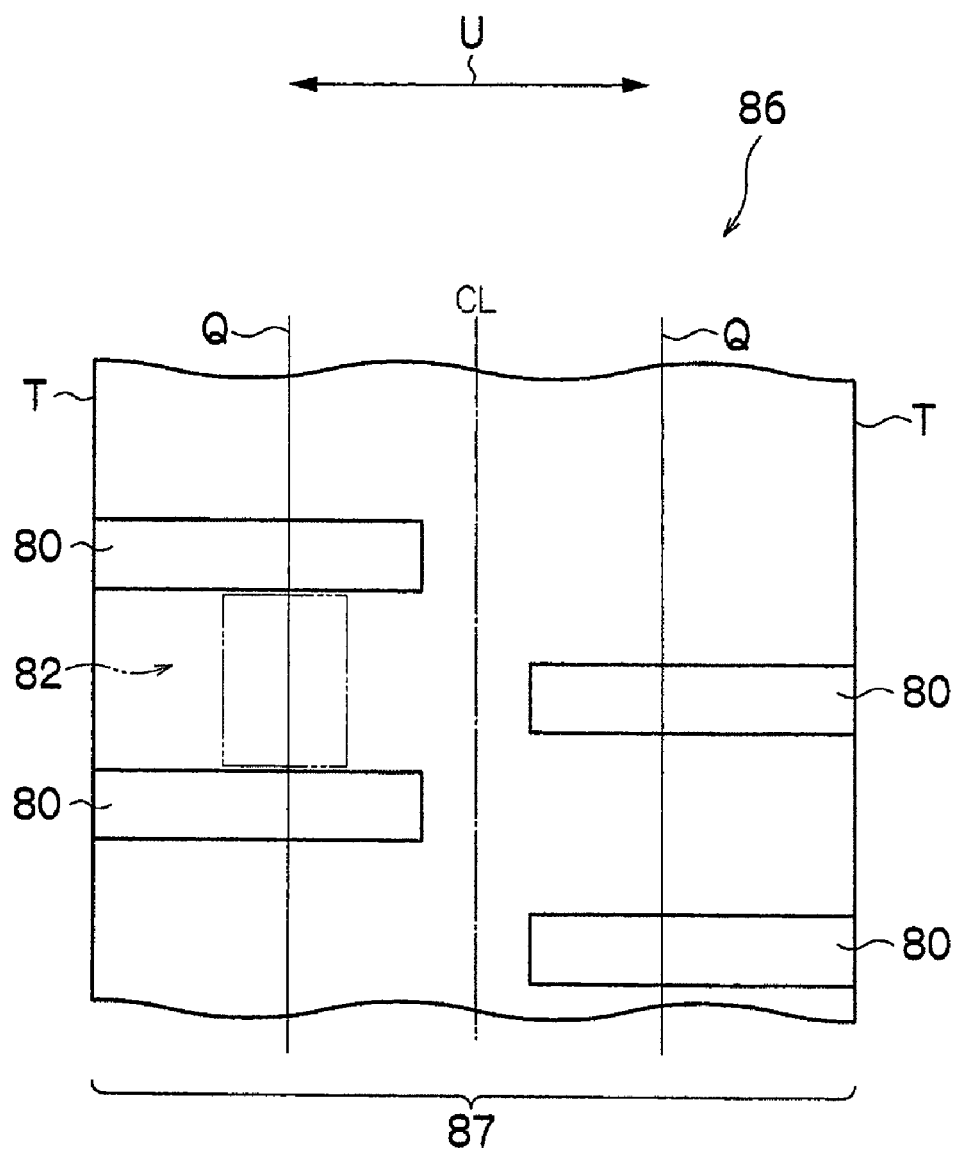
FIG. 6 is a partly plan view showing a lug groove pattern within a tread width in a conventional pneumatic tire.

The inventors of the invention first execute a performance test by using a pneumatic tire (a pneumatic tire in the related art 1, refer to FIG. 6) in which a tire size is 4000R57, and a block portion 82 near the one quarter point Q as seen from the tire tread surface side is rectangular, as a conventional pneumatic tire for a construction vehicle.

In the present test example, a pitch number of lug grooves 80 of the pneumatic tire in the related art 1 is 36, and all of angles of the lug grooves 80 with respect to the tire width direction are 0 degree.

A test condition is set such that a tire is attached to a front side of a 240 ton load dump truck, an abrasion resistance is measured after operating for one hundred days in a copper mine in the United States, and an index 100 is set as a reference value. A tire structure and the index are shown in Table 1.

1) in which the tire size is identical to the pneumatic tire in the related art 1 mentioned above. In the pneumatic tire in the example 1, the angle θ formed by the oblique lines 29A and 19B of the tapered groove portion 31 with respect to the tire width direction is set to 11 degrees. Further, the abrasion resistance is measured, and the performance index corresponding to the relative evaluation with respect to the pneumatic tire in the related art 1 is calculated. The tire structure of the pneumatic tire in the example 1 and the calculated performance index are shown together in Table 1.

Further, the inventors of the invention execute the performance test under the same condition by using a pneumatic tire in the third embodiment (the pneumatic tire in the example 2) in which the tire size is identical to the pneumatic tire in the related art 1 mentioned above. In the pneumatic tire in the example 2, the angle θ is set to 15 degrees. Further, the abrasion resistance is measured, and the performance index corresponding to the relative evaluation with respect to the pneumatic tire in the related art 1 is calculated, in the same manner as the pneumatic tire in the example 1. The tire structure of the pneumatic tire in the example 2 and the calculated performance index are shown together in Table 1.

As is understood from Table 1, there is obtained a result that in comparison with the pneumatic tire in the related art 1,

TABLE 1

|  | Heavy load tire for construction vehicle in example 1 | Heavy load tire for construction vehicle in example 2 | Heavy load tire for construction vehicle in related art 1 | Heavy load tire for construction vehicle in related art 2 |
| --- | --- | --- | --- | --- |
| Number of rug grooves | 36 | 36 | 36 | 36 |
| Negative rate | 20% | 20% | 20% | 20% |
| Shape of block portion near a one quarter point as seen from tire tread surface side | Isosceles trapezoid having short side in shoulder side | Isosceles trapezoid having short side in shoulder side | Rectangle | Parallelogram |
| Angle of slope of rug groove with respect to tire width direction | 11 degrees | 15 degrees | 0 degree | 18 degrees |
| Performance index of abrasion resistance | 110 | 112 | 100 | 90 |

Figure 7:
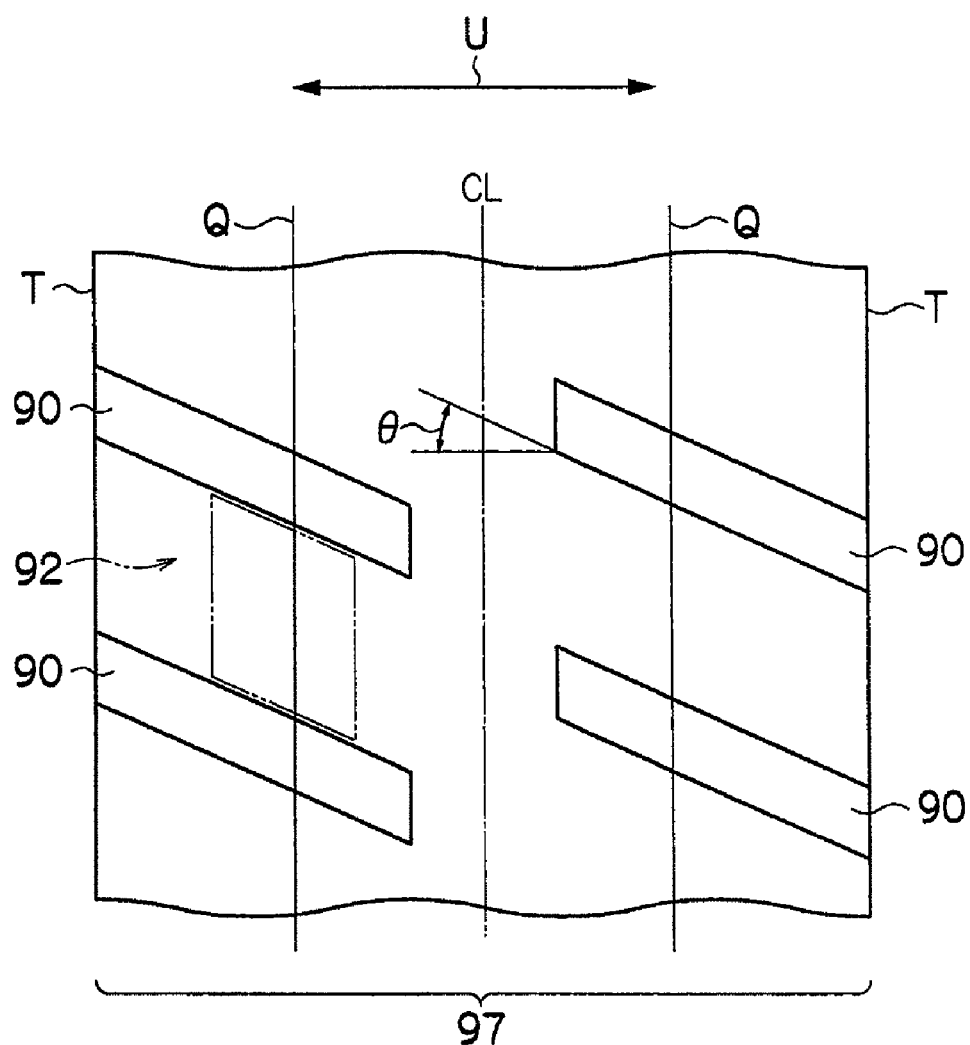
FIG. 7 is a partly plan view showing a lug groove pattern within a tread width in a conventional pneumatic tire.
Figure 8:
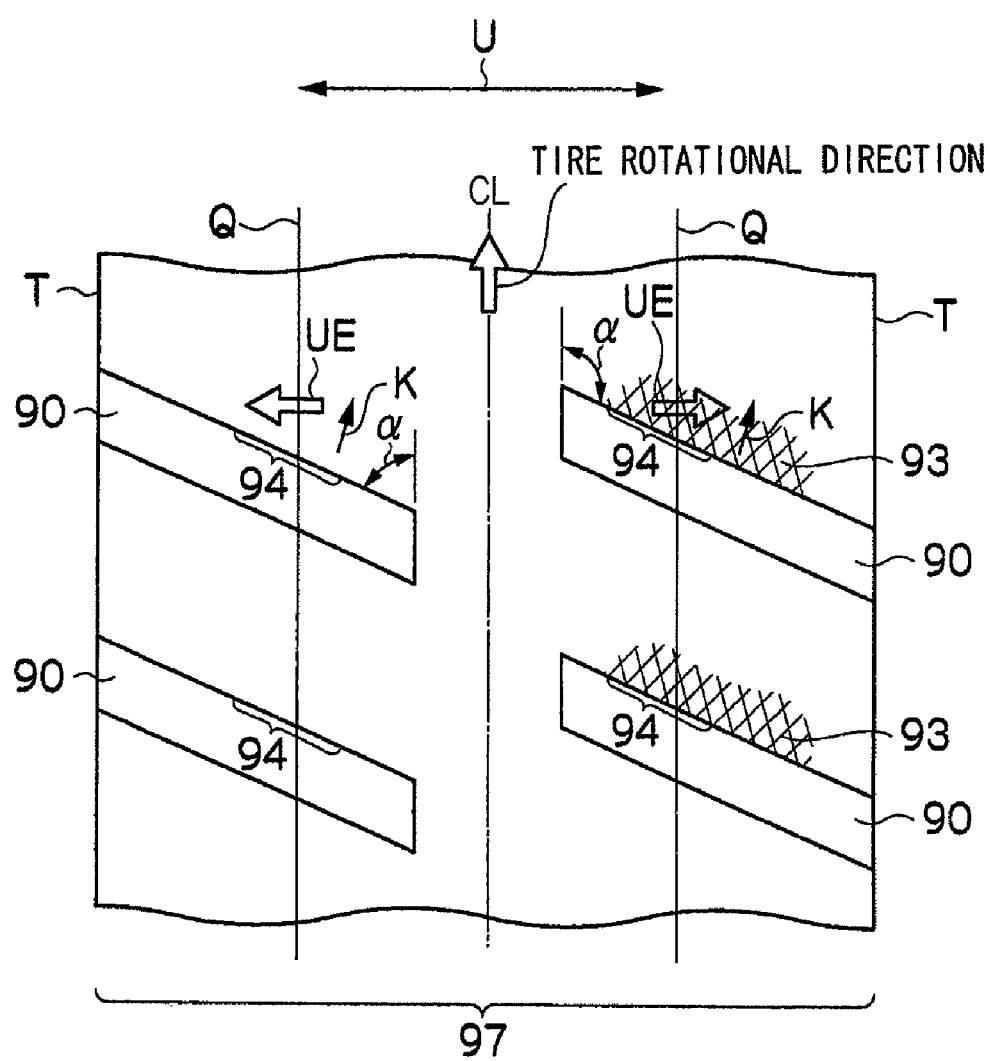
FIG. 8 is a partly plan view showing a fact that a land portion at a trailing side of a lug groove tends to wear, in the conventional pneumatic tire.
Figure 9:
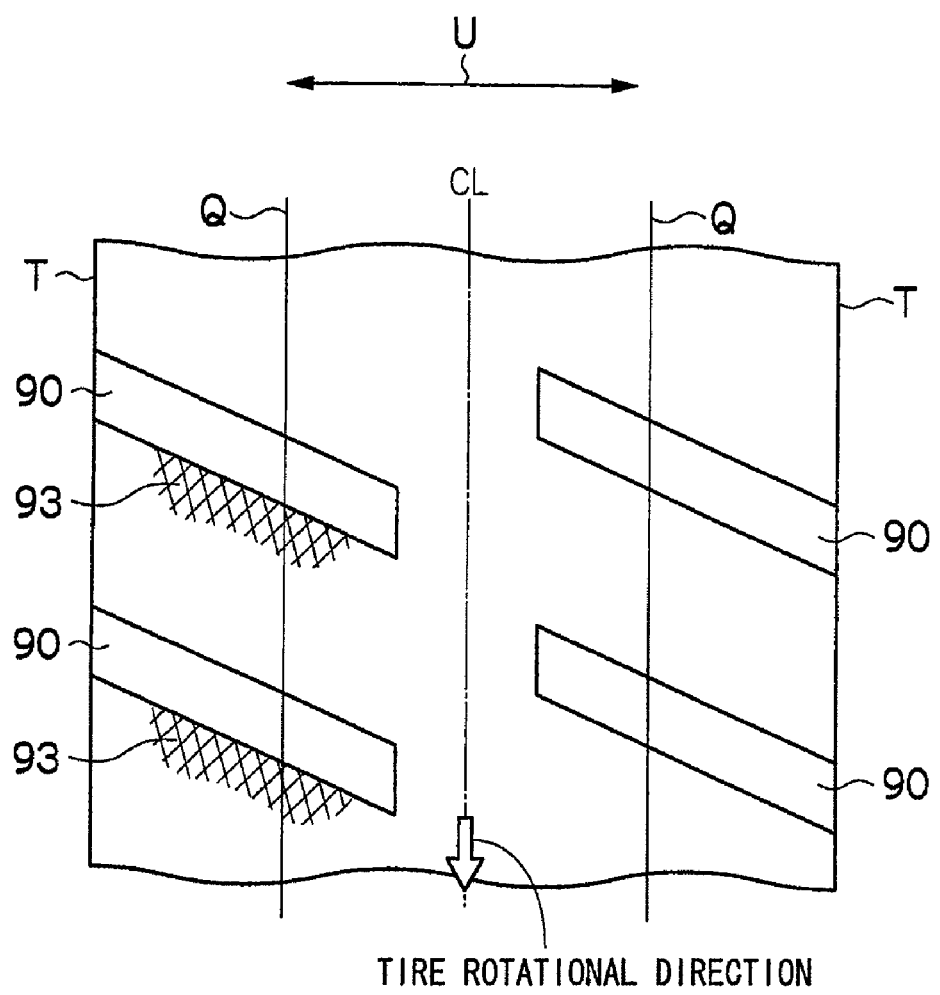
FIG. 9 is a partly plan view showing a fact that a land portion at a trailing side of a lug groove tends to wear, in the conventional pneumatic tire.

Further, the inventors of the invention execute a performance test under the same condition by using a pneumatic tire (refer to FIG. 7) in the related art 2 in which a tire size is the same as the pneumatic tire in the related art 1 mentioned above, and a block portion 92 near the one quarter point Q as seen from the tire tread surface side is parallelogram.

In the present test example, a pitch number of the lug grooves 90 of the pneumatic tire in the related art 2 is 36, and all of the angles θ formed by the lug grooves 90 with respect to the tire width direction are 18 degrees.

Further, the abrasion resistance is measured, and a performance index corresponding to a relative evaluation with respect to the pneumatic tire in the related art 1 is calculated. The tire structure and the calculated performance index of the pneumatic tire in the related art 2 are shown together in Table 1. In Table 1, there are shown a matter that the larger the performance index is, the better the performance is, and the lower the performance index is, the more inferior the performance is.

Further, the inventors of the invention execute the performance test under the same condition by using a pneumatic tire in the second embodiment (the pneumatic tire in the example the abrasion resistance is widely improved in the pneumatic tire in the example 1, and is further improved in the pneumatic tire in the example 2. In this case, in the pneumatic tire in the related art 2, there is obtained a result that the performance is inferior to the pneumatic tire in the related art 1.

The description is given of the modes for carrying out the invention by giving the embodiments, however, these embodiments are given as examples, and can be variously modified within a range within the scope of the invention. Further, it goes without saying that the claimed region of the invention is not limited to the embodiments mentioned above.

Fifth Embodiment

Figure 10:
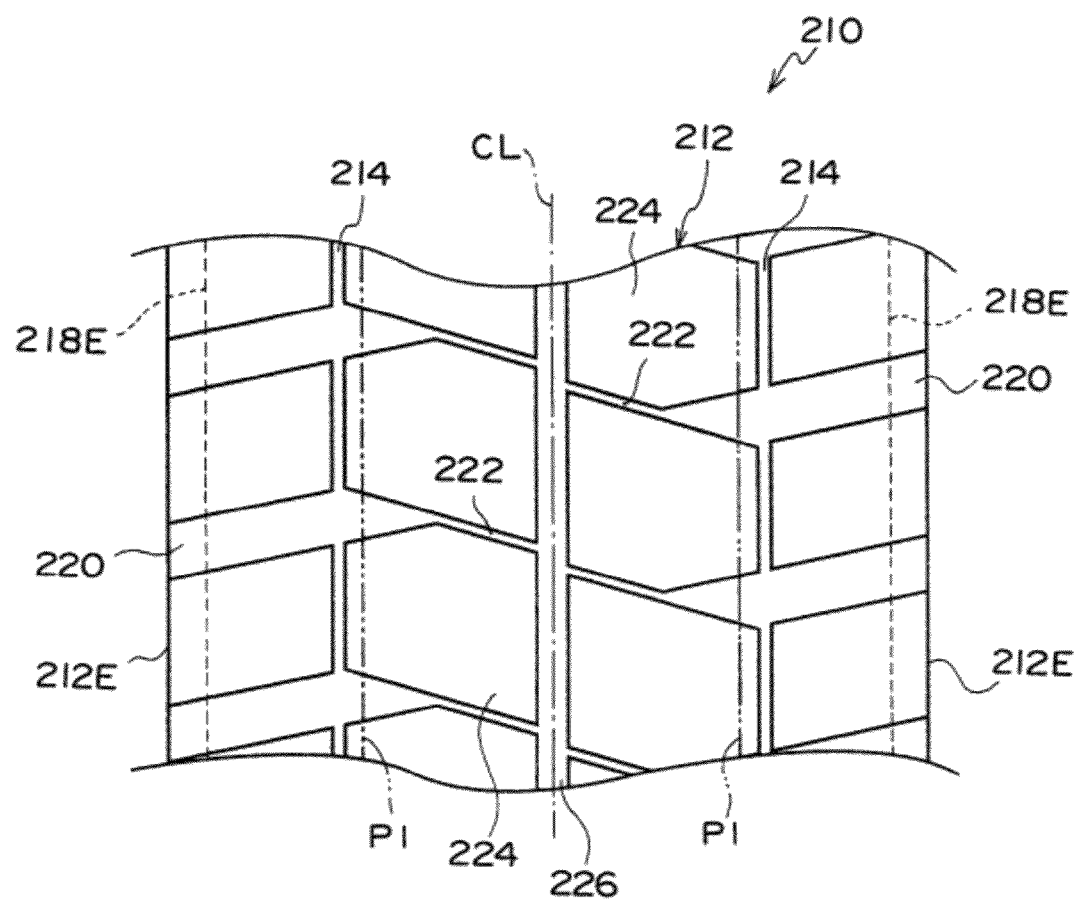
FIG. 10 is a plan view of a tread of a pneumatic tire relating to a fifth embodiment.

As shown in FIG. 10, peripheral narrow grooves 214 extending along the tire peripheral direction are formed at each side of the tire equatorial plane CL, in a tread 212 of a pneumatic tire 210 in the present embodiment.

The pneumatic tire 210 in the present embodiment is provided for the construction vehicle, and a thickness of the tread 212 is 60 mm or more in a center portion.

Figure 11:
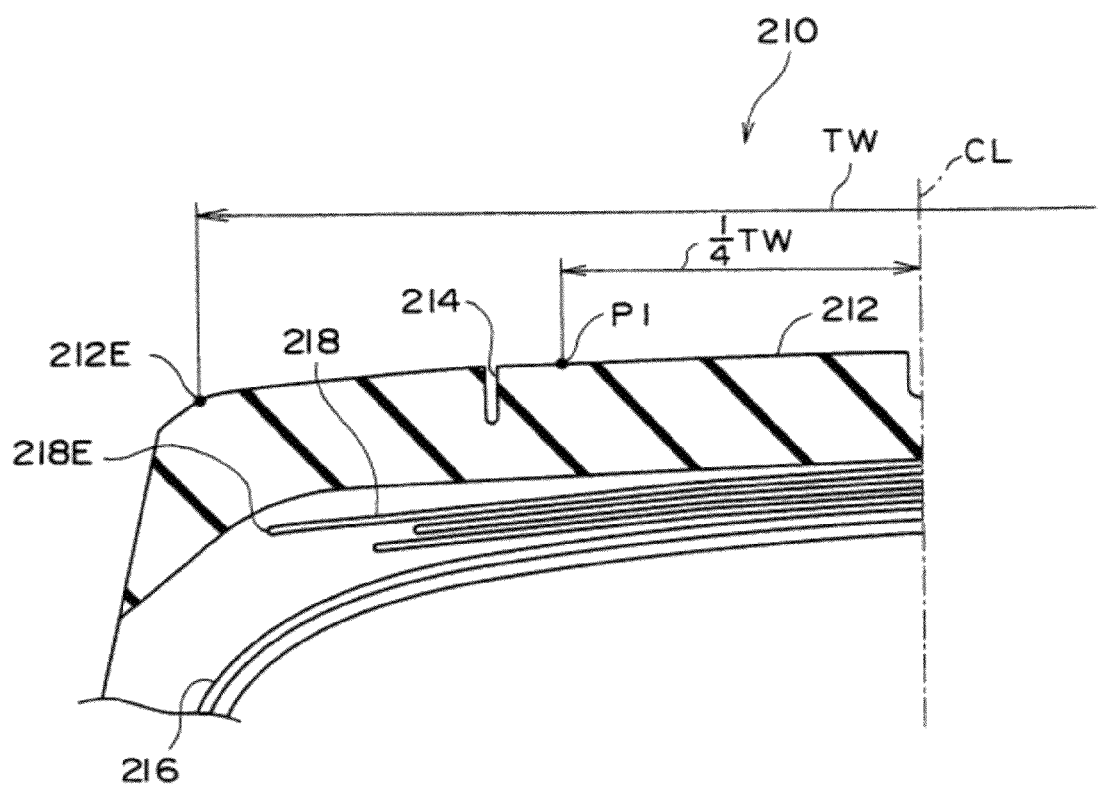
FIG. 11 is a cross sectional view showing a part of the pneumatic tire relating to the fifth embodiment.

As shown in FIG. 11, in this pneumatic tire 210, a belt 218 constituted by a plurality of belt plies is embedded between the tread 212 and a radial carcass 216.

The peripheral narrow groove 214 is disposed at an outer side in a tire width direction than a one quarter point P1 which is one quarter of a tread width TW away from the tire equatorial plane CL to an outer side in the tire width direction, and at an inner side in the tire width direction than an outermost end 218E in a tire width direction of the belt 218.

A groove depth of the peripheral narrow groove 214 is set to be a groove depth or less of a main lug groove 220 mentioned below, and a groove width is set within a range of from 1 to 2.5% of the tread width TW.

A plurality of main lug grooves 220 extending toward the tire equatorial plane CL from a ground contact end 212E are formed in the tread 212 so as to be spaced in the tire peripheral direction.

The main lug groove 220 is terminated at a position which is slightly beyond the one quarter point P1 from the ground contact end 212E.

The main lug groove 220 at a right side of the tire equatorial plane CL and the main lug groove 220 at a left side of the tire equatorial plane CL are disposed so as to be shifted in the tire peripheral direction.

It is preferable that the groove width of the main lug groove 220 is set to a suitable dimension for arranging 32 to 44 main lug grooves 220 per one circle of the tread.

Further, the groove depth of the main lug groove 220 is smaller than a thickness of the tread 212, and is preferably 60 mm or more in the case of being measured at the ground contact end 212E of the tread 212.

As shown in FIG. 10, a widthwise narrow groove 222 connecting the main lug groove 220 at the right side and the main lug groove 220 at the left side is formed in the tread 212, and a block 224 is compartmented by the peripheral narrow groove 214 and the widthwise narrow groove 222 in a center region of the tread 212, between a pair of peripheral narrow grooves 214 in the present embodiment.

The groove width of the peripheral narrow groove 214 is set so as to be choked at a time of being grounded on the road surface at a time of load rolling.

An auxiliary groove 226 extending along the tire peripheral direction is formed in the center (on the tire equatorial plane CL) in the tire width direction of the block 224.

Further, it is preferable that a maximum depth of the auxiliary groove 226 is set between one eighth and one third of the groove depth of the main lug groove 220.

Figure 12:
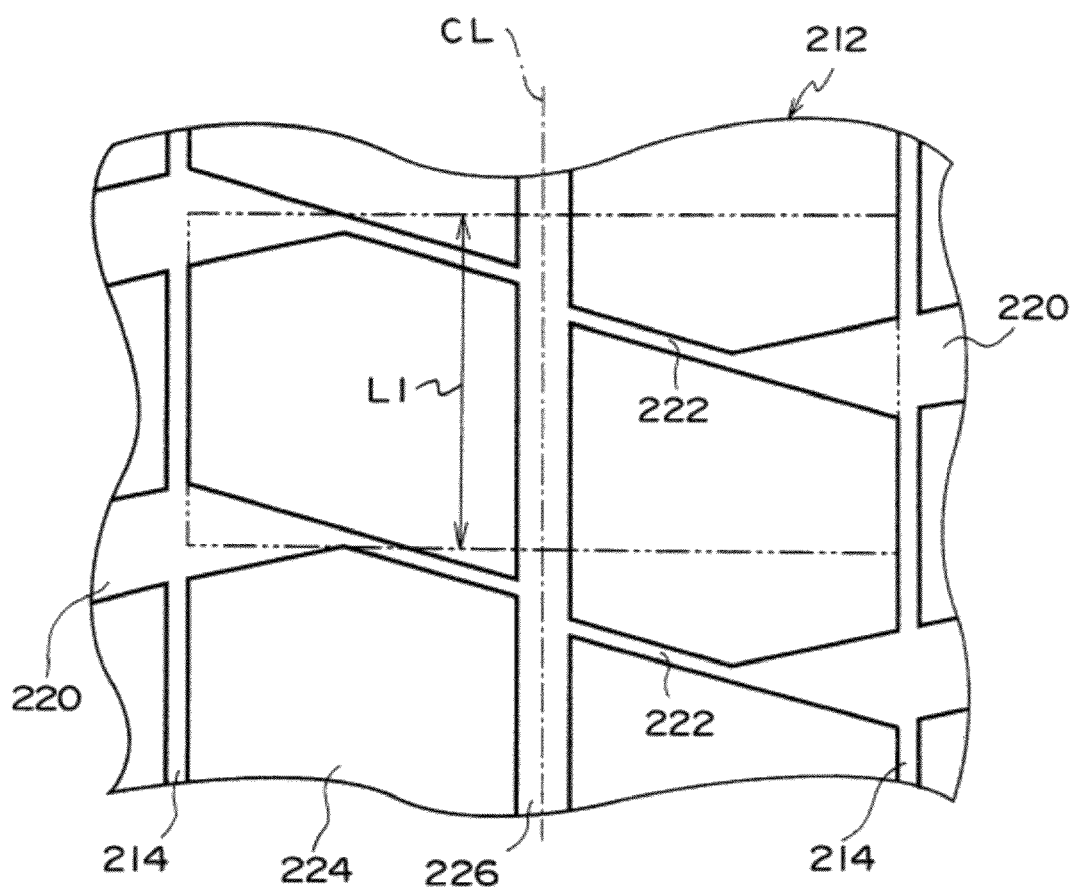
FIG. 12 is an enlarged plan view of a center portion of the tread shown in FIG. 10.

As shown in FIG. 12, it is preferable that a negative rate at the inner side of a pair of peripheral narrow grooves 214, and within the region of the length L1 corresponding to one pitch of the main lug groove 220 in the tire peripheral direction (for example, a region surrounded by a two-dot chain line in the drawing) is set within a range of from 15 to 30%.
(Operation)

Next, a description will be given of an operation of the pneumatic tire 210 according to the present embodiment.

In the pneumatic tire 210 in the present embodiment, since a pair of peripheral narrow grooves 214 set to the grove width which is choked at a time of being grounded are disposed at the outer side in the tire width direction than the one quarter point P1, and at the inner side in the tire width direction than the tire widthwise outermost end 218E, it is possible to suppress the motion of the tread surface to the outer side at a time of being trailed due to the belt curved deformation, near the one quarter point P1. As a result, it is possible to improve the abrasion resistance of the tread 212 near the one quarter point P1.

Further, since the auxiliary groove 226 is formed in the block 224 being compartmented by the center portion of the tread 212, it is possible to radiate the heat generated from the block 224 due to the load rolling from the auxiliary groove 226, and it is possible to intend to improve a heat generation resistance.

In this case, if the negative rate within a pair of peripheral narrow grooves 214 of the tread 212 and within the region of the length corresponding to one pitch of the main lug groove 220 in the tire peripheral direction becomes less than 15%, it is impossible to sufficiently radiate the heat of the tread 212 under the use in the market.

On the other hand, if the negative rate gets over 30%, a stone biting characteristic in the center portion of the tread 212 is deteriorated, and the groove tends to bite a stone at a time of traveling on the punishing road.

Further, if the groove width of the widthwise narrow groove 222 becomes less than 1% of the tread width TW, a durability of a mold frame (or a blade (a metal plate)) for forming the widthwise narrow groove 222 is undesirably lowered.

On the other hand, if the groove width of the widthwise narrow groove 222 gets over 2.5% of the tread width TW, the motion of the tread 212 becomes enlarged at a time of load rolling, and causes the abrasion.

If the maximum depth of the auxiliary groove 226 is less than one eighth of the groove depth of the main lug groove 220, the heat radiation of the heat generated in the block 224 becomes insufficient.

On the other hand, if the maximum depth of the auxiliary groove 226 gets over one third of the groove depth of the main lug groove 220, the motion of the tread 212 becomes enlarged at a time of load rolling, and causes a deterioration of the abrasion resistance.

In this case, the widthwise narrow groove 222 in the present embodiment is formed in the linear shape, however, the present invention is not limited to this, but may be formed in a zigzag shape or the like.

In the present embodiment, the description is given of the example in which the invention is applied to the pneumatic tire for the construction vehicle, however, it goes without saying that the invention can be applied to the tires for the other vehicles than the construction vehicle.

Test Example 2

In order to confirm the effect of the invention, an abrasion resistance index is compared by preparing the pneumatic tire in a related art example and the pneumatic tire in an example to which the invention is applied.

Example

Structure in the Fifth Embodiment Mentioned Above

Figure 13:
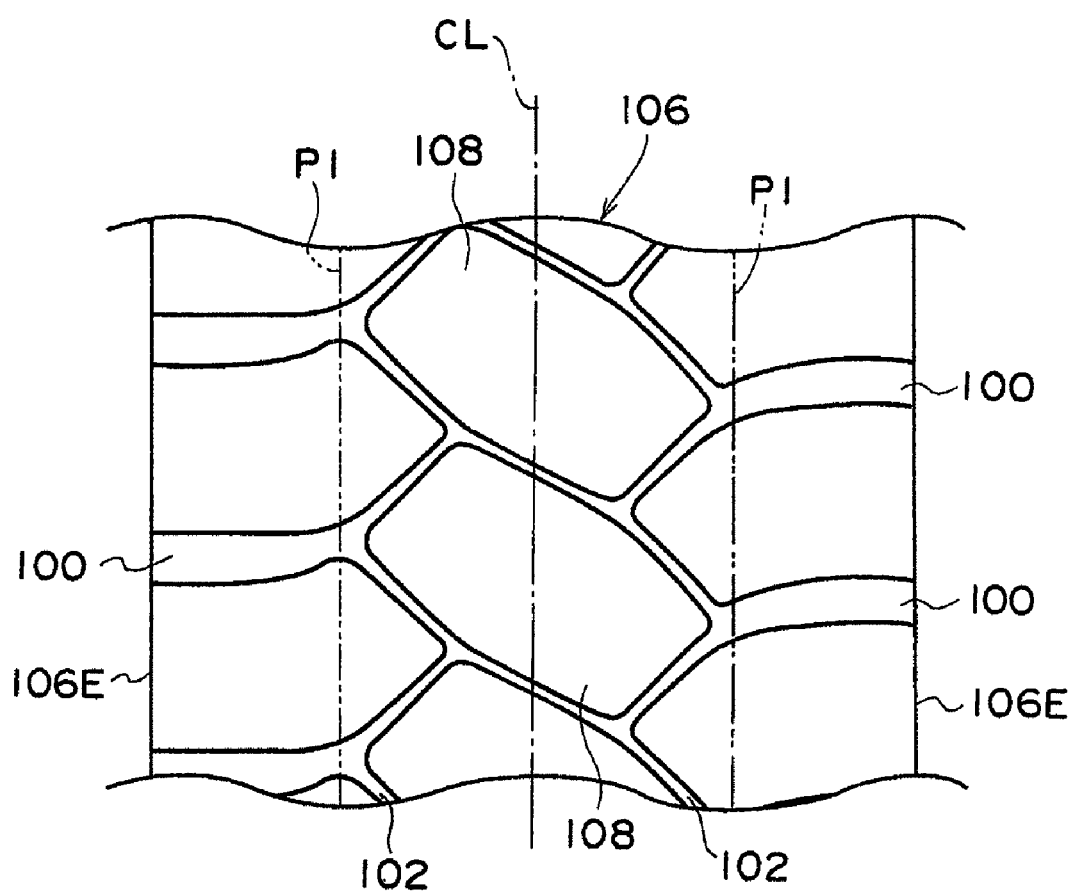
FIG. 13 is a plan view of a tread of a pneumatic tire relating to a related art used in a test.
Figure 14:
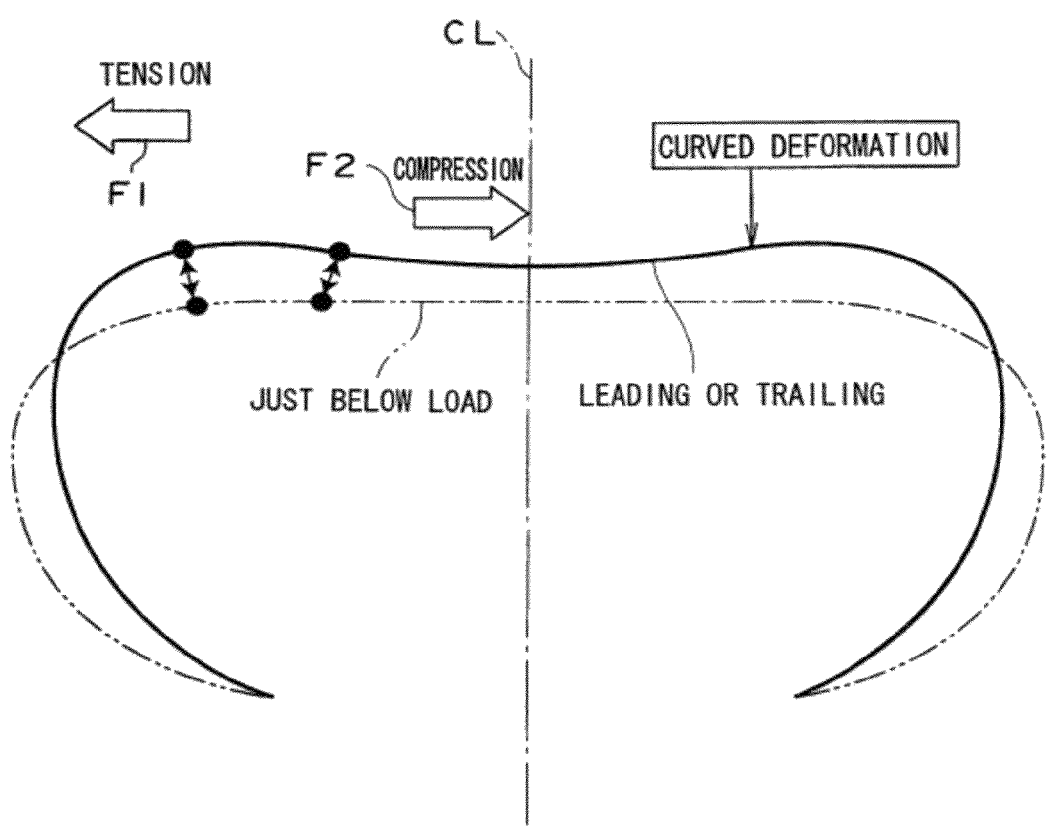
FIG. 14 is an explanatory view showing a deformation of the tire.
Figure 15:
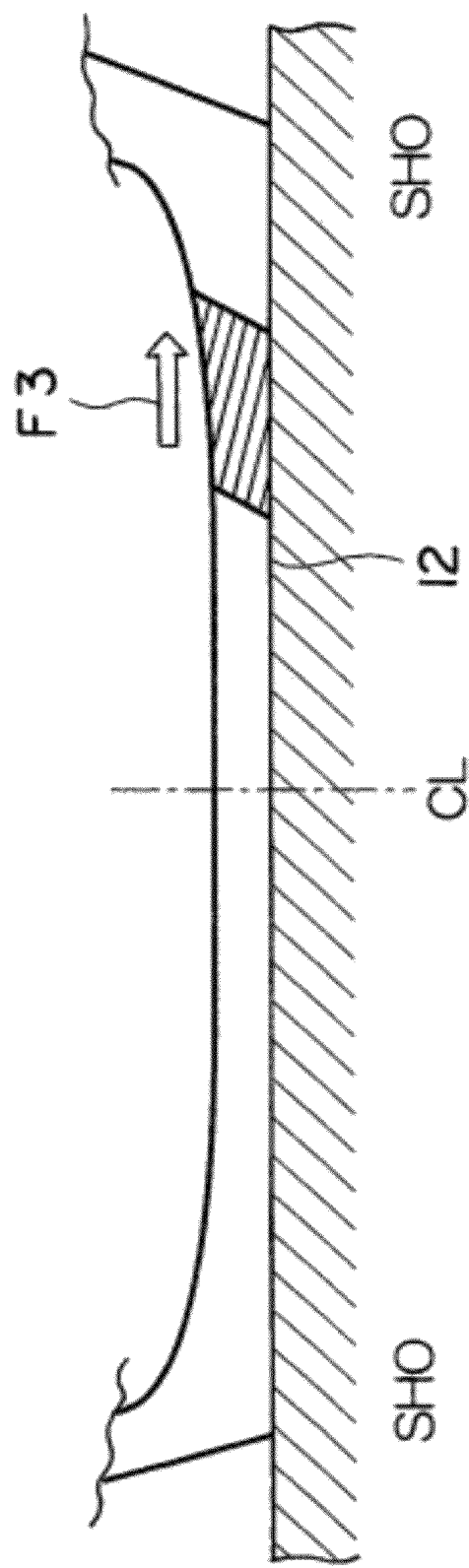
FIG. 15 is a cross sectional view showing a deformation of the tread.
Figure 16:
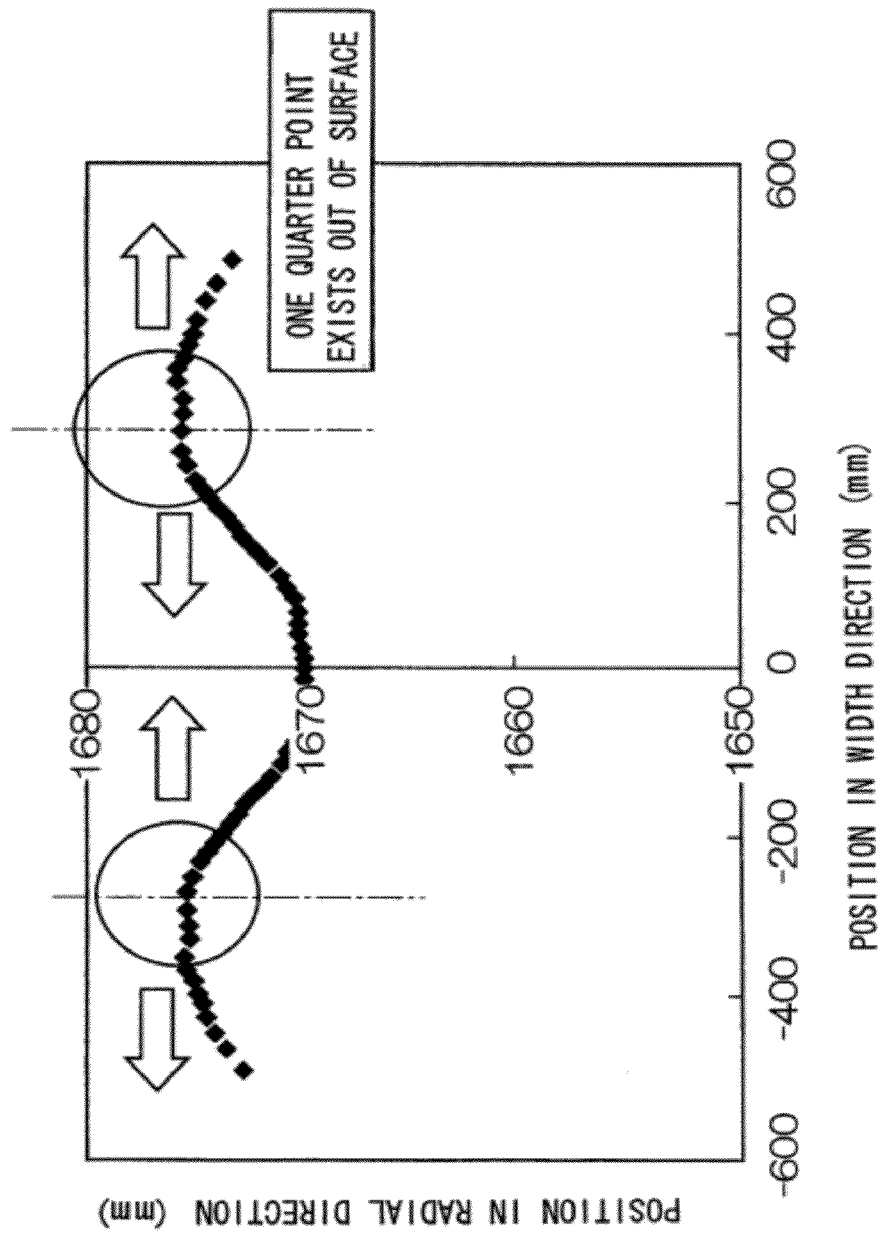
FIG. 16 is a graph showing a curved state of a tread surface.

Related art example: structure provided with a main lug groove 100, peripheral narrow grooves 102 extending in a zigzag shape in the tire peripheral direction and connected to the main lug groove 100, and a widthwise narrow groove 104 connecting the right and left peripheral narrow grooves 102, and in which a block 108 is compartmented in a center of a tread 106 by the peripheral narrow grooves 102 and the widthwise narrow groove 104, as shown in FIG. 13. Note that a groove corresponding to the auxiliary groove in the example is not formed in the block 108. Further, in FIG. 13, reference symbol P1 denotes a one quarter point, and reference symbol 106E denotes a tread end. In this case, an internal structure of the tire is the same structure as the example.

Test Condition
- tire size: 4000R57
- rim: 29 inch diameter×6 inch flange height
- internal pressure: 700 kPa
- load: TRA standard 100% Load (60 ton)

The tire is rolled under the condition mentioned above, and an amount of motion of the one quarter point of the tread surface is measured. An evaluation is executed by an index display by setting an inverse number of an amount of motion of the related art to 100, and indicates that the greater the numerical value is, the more excellent the abrasion resistance is.

TABLE 2

|  | Example | Related art example |
|---|---|---|
| Tread width | 980 mm | 980 mm |
| Tread layer gauge (tire equatorial plane) | 110 mm | 110 mm |
| Main rug groove average depth | 90 mm | 90 mm |
| Peripheral narrow groove depth | 30 mm | 30 mm |
| Distance of peripheral narrow groove from tire equatorial plane (measured in center of amplitude in case of zigzag) | 290 mm (near a one quarter point) | 145 mm (near a one eighth point) |
| With or without auxiliary groove | With | Without |
| Tread surface average moving amount at a time of leading and trailing (position of a one quarter point) | 2.0 mm | 2.5 mm |
| Abrasion resistance index (INDEX) | 125 | 100 |

Note that the one eighth point in the table indicates a position which is one eighth of the tread width away from the tire equatorial plane toward the tread end.

As shown by the results of the test, it is understood that the pneumatic tire in the present example to which the invention is applied has a less motion at the one quarter point of the tread than the pneumatic tire in the related art example, and is excellent in the abrasion resistance at the one quarter point.

INDUSTRIAL APPLICABILITY

The pneumatic tire in the present invention can be applied to an intended use for traveling on a rough road by the construction vehicle or the like.

| Description of Reference Numerals | |
|---|---|
| 10 | pneumatic tire |
| 16 | tread portion |
| 17 | tread surface portion |
| 20 | lug groove |
| 21 | tapered groove portion |
| 22 | trapezoidal block portion (trapezoidal block portion) |
| 31 | tapered groove portion |
| 32 | trapezoidal block portion (trapezoidal block portion) |
| 37 | tread surface portion |

| Description of Reference Numerals | |
|---|---|
| 41 | tapered groove portion |
| 42 | trapezoidal block portion (trapezoidal block portion) |
| 47 | tread surface portion |
| 54 | narrow groove (groove) |
| 55 | tread center portion |
| 56 | center groove (groove) |
| 57 | tread surface portion |
| 86 | tread portion |
| 87 | tread surface portion |
| 80 | lug groove |
| 97 | tread portion |
| 90 | lug groove |
| CL | tire equatorial plane |
| Q | one quarter point |
| T | tread end |
| θ | angle |
| 210 | pneumatic tire |
| 212 | tread |
| 212E | ground contact end |
| 214 | peripheral narrow groove |
| 216 | radial carcass |
| 218 | belt |
| 220 | main lug groove |
| 222 | widthwise narrow groove |
| 224 | block |
| 226 | auxiliary groove |

What is claimed is:

1. A pneumatic tire having a non-specified rotational direction and comprising lug grooves cutting across at least a land portion at a shoulder side of a tread portion at both sides in a tire width direction, wherein:
   the number of the lug grooves is in a range of from 32 to 44 at each side in the tire width direction;
   a negative rate of a tread surface portion of the tread portion is in a range of from 15 to 30%;
   each of the lug grooves comprises a tapered groove portion wherein a groove width gradually becomes narrower such that a trapezoidal block portion having a short side at the shoulder side as seen from a tire tread surface side and having a tread surface which is formed in an isosceles trapezoidal shape is formed between the lug grooves in a tire peripheral direction, one side of each of the lug grooves is entirely formed of a straight section, and the other side of each of the lug grooves is formed of a straight section that is parallel to the one side and a tapered section which tapers toward an end of the one side to form the tapered groove portion;
   the tapered groove portion is formed such that a distance from a tread end extends beyond a one quarter point corresponding to one half of a length from the tread end to the tire equatorial plane, and the tapered section extends beyond the one quarter point; and
   an approximately middle point of an oblique line of the trapezoidal block portion is positioned at the one quarter point.

2. The pneumatic tire according to claim 1, wherein an angle formed by an oblique line of the tread surface of the trapezoidal block portion and the tire width direction is from 10 degrees to 20 degrees.

* * * * *